No. 758,850. PATENTED MAY 3, 1904.
H. PEYTON & G. BODSON.
MUSIC LEAF TURNER.
APPLICATION FILED SEPT. 15, 1903.
NO MODEL.
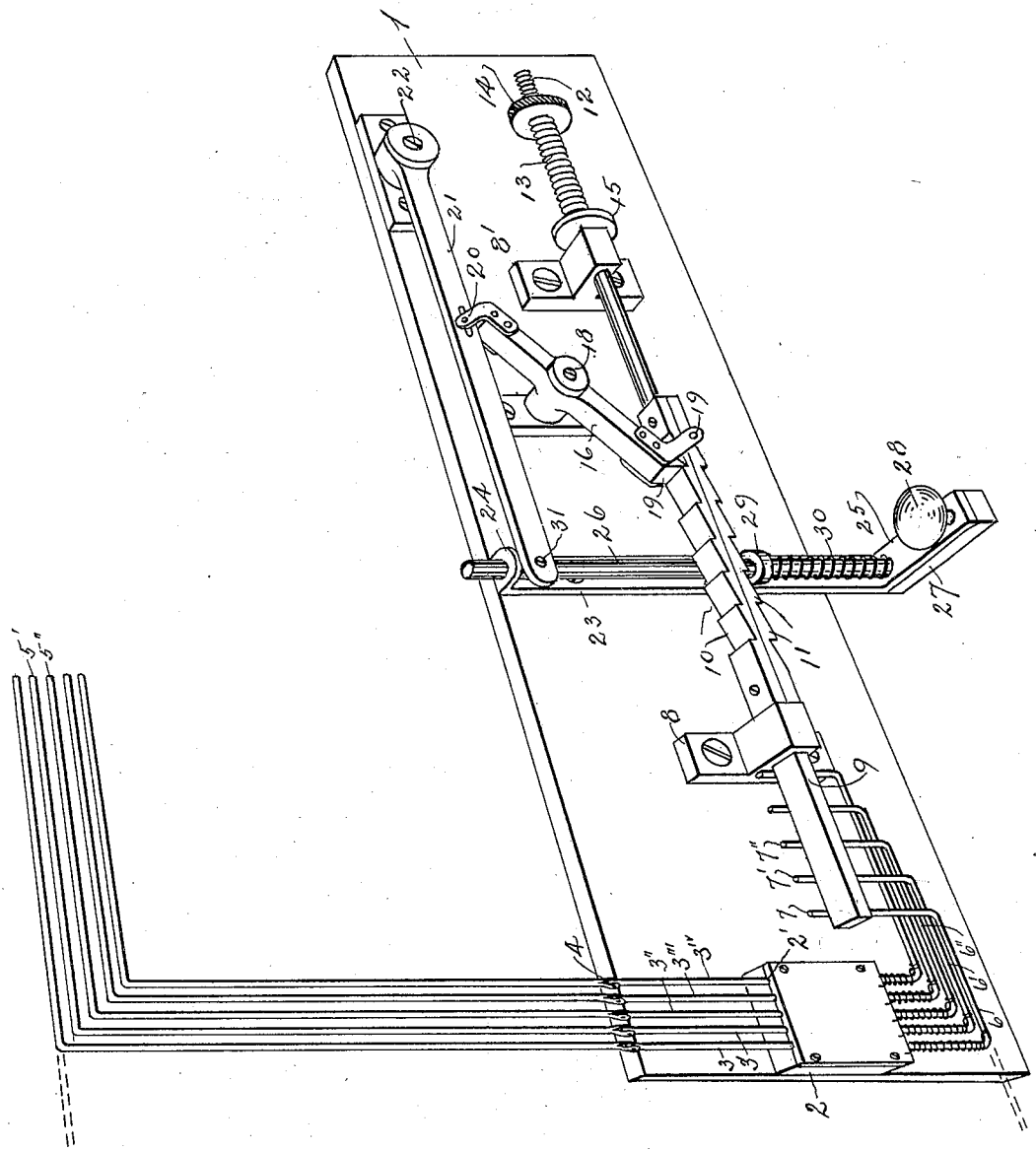
Witnesses. Inventors
Harry Peyton
Gustave Bodson
Attorney.

No. 758,850.                                                                                      Patented May 3, 1904.

UNITED STATES PATENT OFFICE.

HARRY PEYTON AND GUSTAVE BODSON, OF CHARLEROI, PENNSYLVANIA.

MUSIC-LEAF TURNER.

SPECIFICATION forming part of Letters Patent No. 758,850, dated May 3, 1904.

Application filed September 15, 1903. Serial No. 173,311. (No model.)

*To all whom it may concern:*

Be it known that we, HARRY PEYTON and GUSTAVE BODSON, citizens of the United States, residing at Charleroi, in the county of Washington and State of Pennsylvania, have invented a new and useful Improvement in Music-Leaf Turners, of which improvement the following is a specification.

Our invention relates to music-leaf turners; and its object is to provide a new and improved article for the purpose specified.

Our invention consists of certain novel combinations of parts and arrangements of details hereinafter fully described and claimed.

In the accompanying drawing like characters of reference refer to like parts throughout, and the figure represents a perspective view of our device.

The numeral 1 indicates the body portion or frame of our device, which may be made solid, as here shown, or formed in any other desired manner. A block 2 is attached toward one end of our device, upon which are held suitable bearings 2'. Rods 3 3', &c., having joints at 4, are held to turn in said bearings. Angled portions 5 5' 5'', &c., are formed on each of said rods at the upper ends thereof, and other angled portions 6 6' 6'', &c., are formed at the lower ends thereof. Upturned ends 7 7' 7'', &c., are formed upon the lower angled portions. Bearings 8 8' are securely held upon said body 1, and a release-bar 9 of preferably square cross-section passes through these bearings. Teeth 10 are formed upon one side of this bar, and oppositely disposed and arranged teeth 11 are formed upon the opposite side thereof. A screw-threaded end 12 is formed upon the end of the bar 9 and carries a spring 13 and adjusting-nut 14, adapted to compress said spring between itself and a washer 15, situated at the bearing or guide 8'.

A lever 16 is pivotally mounted at 18. Escapement-pallets 19 are carried on the lower end of this lever and act upon the release-bar. The opposite end of lever 16 is pivoted, as at 20, to a lever 21. The lever 21 is pivoted to the frame 1 at 22. A guide-frame 23 is held on the frame 1, as shown. A guide 24 is held upon this frame. A lower guide 25 is also formed thereon. A presser-bar 26, having an angled portion 27, press-button 28, and collar 29, is held to move in said guides and is provided with a spring 30 to normally hold it in its upper position. The presser-bar 26 is pivotally attached to the lever 21, as at 31.

It will be clearly seen from the drawing that when the button 28 is pushed downward the upper one of the escapement-pallets 19 will be raised and the bar 9 moved forward by the spring 13 a slight amount. At the same time it will be restrained from too great a movement by the lower pallet. Upon the bottom being released the escapement returns to its original position and the next tooth catch upon the upper pallet. While this motion is taking place the movement of the bar 9 releases the first of the leaf-levers, which thereupon turns to the position shown in dotted lines.

It will be obvious that the presser-bar 26 and guide-frame 23 may be made as long as desired and that our device may be used by violinists and others, who may operate the press-button with the foot.

We have thus invented a new and useful article of the character specified.

Having thus described our invention, we claim—

1. In a music-leaf turner, the combination of a frame, a series of hinged leaf-levers rotatably mounted thereon, a series of springs each carried upon one of said levers and normally tending to rotate the same, a series of upturned ends each formed upon one of said levers, a spring-operated escapement-bar slidably mounted upon said frame and held in its locking position to cover said series of upturned lever ends, a series of oppositely disposed and arranged teeth formed upon said escapement-bar, escapement-pallets held to embrace said escapement-bar, a lever pivotally mounted upon said frame and carrying said pallets, a second lever pivotally mounted upon said frame and connected to the first-mentioned lever, a presser-bar connected to said second lever, guides for said presser-bar, a presser-button attached to said presser-bar and a spring normally holding said bar in a raised position, substantially as shown and described.

2. In a music-leaf turner, the combination with a frame, of a series of leaf-levers swingingly mounted thereon, each lever provided with a spring normally retracted, a reciprocating escapement-bar normally holding the levers in their retracted positions and provided with oppositely-disposed ratchet-teeth, a pawl engaging the oppositely-disposed ratchet-teeth, resilient means carried by the escapement-bar tending to retract the said bar, means connected to the pawl for operating the same, and resilient means connected to the pawl-operating means whereby the pawl is operated intermittently, substantially as described.

In testimony whereof we have hereunto signed our names in the presence of two subscribing witnesses.

HARRY PEYTON.
GUSTAVE BODSON.

In presence of—
W. GILLIS,
FRED O. HENZI.